United States Patent
Boddakayala et al.

(10) Patent No.: US 11,872,423 B2
(45) Date of Patent: Jan. 16, 2024

(54) BATTERY THERMAL SUPPRESSION SYSTEMS

(71) Applicant: FORD GLOBAL TECHNOLOGIES, LLC, Dearborn, MI (US)

(72) Inventors: Bhaskara Rao Boddakayala, Troy, MI (US); Deborah Frances Mielewski, Ann Arbor, MI (US); Adam Denlinger, Saline, MI (US); Alper Kiziltas, Kars (TR); Haibo Zhao, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/686,806

(22) Filed: Mar. 4, 2022

(65) Prior Publication Data
US 2023/0277882 A1 Sep. 7, 2023

(51) Int. Cl.
| | |
|---|---|
| A62C 3/07 | (2006.01) |
| A62C 3/16 | (2006.01) |
| H01M 10/625 | (2014.01) |
| H01M 50/383 | (2021.01) |
| B60L 3/00 | (2019.01) |

(52) U.S. Cl.
CPC .................. *A62C 3/07* (2013.01); *A62C 3/16* (2013.01); *B60L 3/0046* (2013.01); *H01M 10/625* (2015.04); *H01M 50/383* (2021.01); *H01M 2200/10* (2013.01); *H01M 2220/20* (2013.01)

(58) Field of Classification Search
CPC ........... A62C 3/07; A62C 3/16; B60L 3/0046; H01M 10/625; H01M 50/383; H01M 2200/10; H01M 2220/20
See application file for complete search history.

(56) References Cited

U.S. PATENT DOCUMENTS 9,960,455 B2  5/2018 Specht et al.
2022/0115720 A1 * 4/2022 Chang .................... A62C 5/006

FOREIGN PATENT DOCUMENTS

| CN | 105617576 A | * | 6/2016 | |
|---|---|---|---|---|
| CN | 108923089 A | * | 11/2018 | |
| CN | 112310533 A | * | 2/2021 | ............... A62C 3/07 |
| EP | 3907814 A1 | | 11/2021 | |
| JP | 2021-190360 | | 12/2021 | |
| JP | 6984879 B2 | | 12/2021 | |
| KR | 101940496 B1 | * | 1/2019 | |
| WO | 2021/230528 A1 | | 11/2021 | |

OTHER PUBLICATIONS

Song, KR101940496 B1 Espacenet machine translation, 2019 (Year: 2019).*
Chen, CN-105617576-A Espacenet machine translation, 2019 (Year: 2016).*
Sun, CN-108923089-A Espacenet machine translation, 2019 (Year: 2018).*

* cited by examiner

*Primary Examiner* — Adam A Arciero
(74) *Attorney, Agent, or Firm* — David B. Kelley; Carlson, Gaskey & Olds, P.C.

(57) ABSTRACT

Battery thermal suppression systems may be provided for battery arrays and/or traction battery packs. Exemplary thermal suppression systems may include one or more aerosol devices that are adapted to release aerosol particles that may be distributed over and/or around battery cells/battery arrays during battery thermal events, thereby mitigating thermal propagation. The aerosol devices may be active or passive devices and can be implanted at the battery array level, the traction battery pack level, or both.

20 Claims, 5 Drawing Sheets

BATTERY THERMAL SUPPRESSION SYSTEMS

TECHNICAL FIELD

This disclosure relates generally to electrified vehicle traction battery packs, and more particularly to thermal suppression system for managing battery thermal events.

BACKGROUND

Electrified vehicles are designed to reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage traction battery pack typically powers the electric machines and other electrical loads of the electrified vehicle. The traction battery pack includes a plurality of battery cells and various other battery internal components that support the electric propulsion of electrified vehicles.

SUMMARY

A battery thermal suppression system according to an exemplary aspect of the present disclosure includes, among other things, a battery array, and an aerosol device integrated as part of the battery array. The aerosol device includes an aerosol ignition portion and an aerosol generating portion that is configured to react with the aerosol ignition portion in response to an ignition of the aerosol ignition portion. The aerosol ignition portion includes nitrocellulose.

In a further non-limiting embodiment of the foregoing battery thermal suppression system, the aerosol generating portion includes potassium nitrate.

In a further non-limiting embodiment of either of the foregoing battery thermal suppression systems, the aerosol device is integrated as part of a support structure that surrounds a cell stack of the battery array.

In a further non-limiting embodiment of any of the forgoing battery thermal suppression systems, a housing of the aerosol device is connected to a top plate of the support structure.

In a further non-limiting embodiment of any of the forgoing battery thermal suppression systems, the aerosol ignition portion is an aerosol ignition sheet and the aerosol generating portion is an aerosol generating sheet that are part of a multi-layered structure arranged within a housing of the aerosol device.

In a further non-limiting embodiment of any of the forgoing battery thermal suppression systems, the multi-layered structure includes the aerosol ignition sheet, the aerosol generating sheet, a spacer, a separator grid, and a direction grid.

In a further non-limiting embodiment of any of the forgoing battery thermal suppression systems, the aerosol ignition portion and the aerosol generating portion are part of a microcapsule housed within a housing of the aerosol device.

In a further non-limiting embodiment of any of the forgoing battery thermal suppression systems, the aerosol ignition portion is established by a nanocoating of the microcapsule, and the aerosol generating portion is established by a nanocapsule of the microcapsule.

In a further non-limiting embodiment of any of the forgoing battery thermal suppression systems, the battery array includes a first battery cell, a second battery cell, and an array spacer plate positioned between the first battery cell and the second battery cell.

In a further non-limiting embodiment of any of the forgoing battery thermal suppression systems, the aerosol device is integrated as part of the array spacer plate.

In a further non-limiting embodiment of any of the forgoing battery thermal suppression systems, the array spacer plate includes a thermal barrier sheet positioned between a pair of compression foam sheets.

In a further non-limiting embodiment of any of the forgoing battery thermal suppression systems, the aerosol device include a plastic sheet coated with a nanocoating. The plastic sheet establishes an aerosol generating portion and the nanocoating establishes an aerosol ignition portion.

In a further non-limiting embodiment of any of the forgoing battery thermal suppression systems, a thermal sensing device is positioned within the battery array and is configured to detect an air temperature within the battery array.

In a further non-limiting embodiment of any of the forgoing battery thermal suppression systems, a control module is programmed to command the ignition of the aerosol ignition portion when the air temperature exceeds a predefined temperature threshold.

In a further non-limiting embodiment of any of the forgoing battery thermal suppression systems, the control module is further programmed to command an alert when the air temperature exceeds the predefined temperature threshold.

A traction battery pack according to another exemplary aspect of the present disclosure includes, among other things, a plurality of battery arrays, a plurality of aerosol devices, a sensor system adapted to sense a temperature inside the traction battery pack, and a control module programmed to activate one or more of the plurality of aerosol devices when the temperature exceeds a predefined temperature threshold.

In a further non-limiting embodiment of the foregoing traction battery pack, each of the plurality of aerosol devices includes an aerosol ignition sheet, an aerosol generating sheet, and an electrical ignition device configured to ignite the aerosol ignition sheet for initiating a reaction mechanism between the aerosol ignition sheet and the aerosol generating sheet.

In a further non-limiting embodiment of either of the foregoing traction battery packs, the aerosol ignition sheet includes nitrocellulose, and the aerosol generating sheet include potassium nitrate.

In a further non-limiting embodiment of any of the foregoing traction battery packs, each of the plurality of aerosol devices further includes a spacer, a separator grid, and a direction grid.

In a further non-limiting embodiment of any of the foregoing traction battery packs, the control module is further programmed to command an alert when the temperature exceeds the predefined temperature threshold.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery thermal suppression systems for battery arrays and/or traction battery packs. Exemplary thermal suppression systems may include one or more aerosol devices that are adapted to release aerosol particles that may be distributed over and/or around battery cells/battery arrays during battery thermal events, thereby mitigating thermal propagation. The aerosol devices may be active or passive devices and can be implanted at the battery array level, the battery pack level, or both. These and other features are discussed in greater detail in the following paragraphs of this detailed description.

Figure 1:
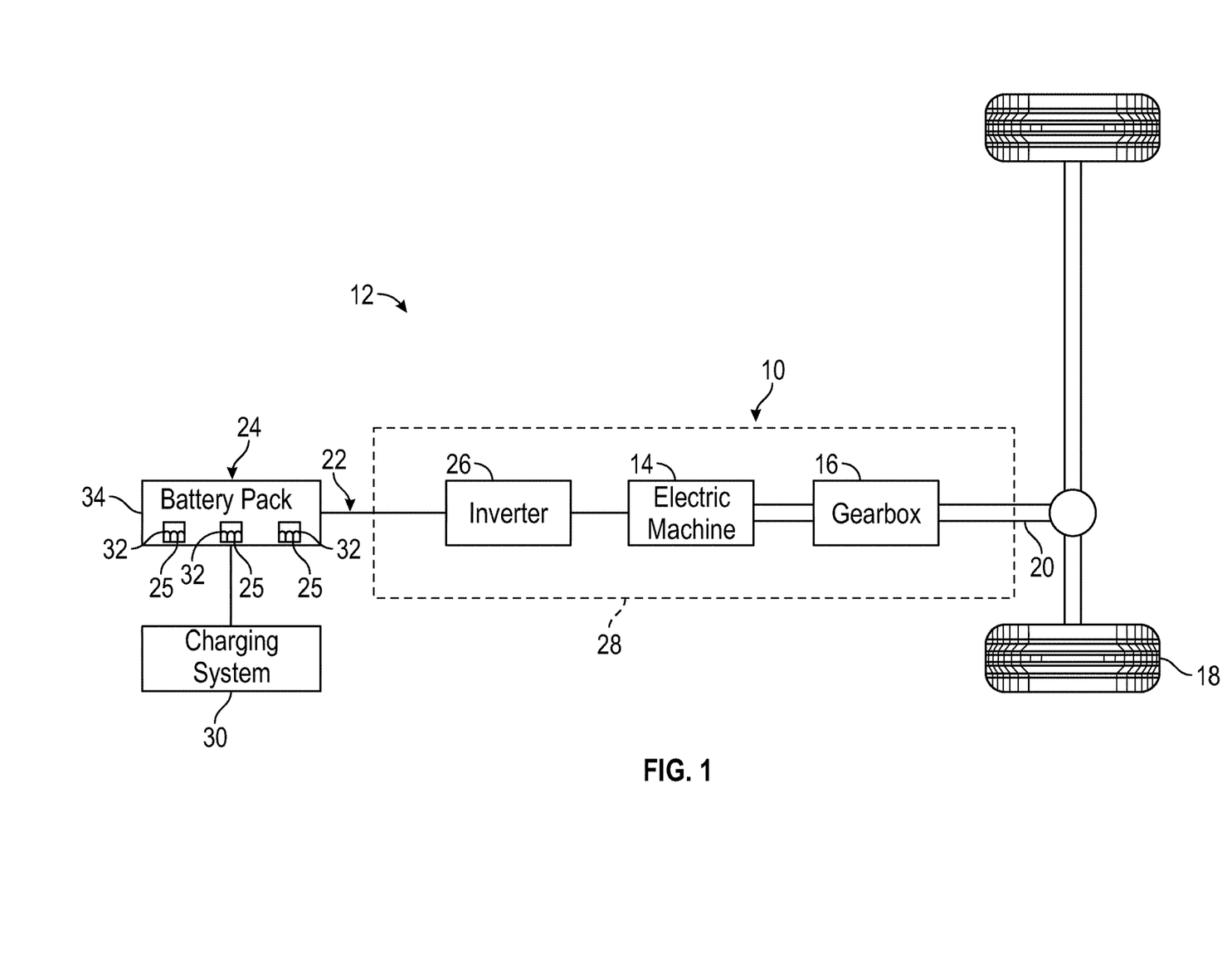
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Although not shown in this exemplary embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 may be operably connected to a set of drive wheels 18 by an output shaft 20.

A voltage bus 22 electrically connects the electric machine 14 to a traction battery pack 24 through an inverter 26, which can also be referred to as an inverter system controller (ISC). The electric machine 14, the gearbox 16, and the inverter 26 may be collectively referred to as a transmission 28 of the electrified vehicle 12.

The traction battery pack 24 is an exemplary electrified vehicle battery. The traction battery pack 24 may be a high voltage traction battery pack that includes one or more battery arrays 25 (i.e., battery assemblies, battery modules, or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The one or more battery arrays 25 of the traction battery pack 24 may each include a plurality of battery cells 32 that store energy for powering various electrical loads of the electrified vehicle 12. The traction battery pack 24 could employ any number of battery cells 32 within the scope of this disclosure. Accordingly, this disclosure should not be limited to the specific configuration shown in FIG. 1.

In an embodiment, the battery cells 32 are lithium-ion cells. However, other cell chemistries (nickel-metal hydride, lithium-iron phosphate, etc.) could alternatively be utilized within the scope of this disclosure.

In another embodiment, the battery cells 32 are cylindrical, prismatic, or pouch battery cells. However, other cell geometries could alternatively be utilized within the scope of this disclosure.

An enclosure assembly 34 may house the battery arrays 25 of the traction battery pack 24. In an embodiment, the enclosure assembly 34 is a sealed outer enclosure that establishes the outermost surfaces of the traction battery pack 24. The enclosure assembly 34 may include any size, shape, and configuration within the scope of this disclosure. The battery arrays 25 and other battery internal components of the traction battery pack 24 are separate structures from the enclosure assembly 34 and therefore are not considered to established any portion of the outermost surfaces of the traction battery pack 24.

The electrified vehicle 12 may also include a charging system 30 for charging the energy storage devices (e.g., the battery cells 32) of the traction battery pack 24. The charging system 30 may include charging components that are located both onboard the electrified vehicle 12 (e.g. vehicle charge port assembly, etc.) and external to the electrified vehicle 12 (e.g., electric vehicle supply equipment (EVSE), etc.). The charging system 30 can be connected to an external power source (e.g., a grid power source) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

During operation of the electrified vehicle 12, the battery cells 32 and other internal components of the traction battery pack 24 can experience a relatively rare event known as thermal runaway during certain battery thermal events (e.g., overcharging, overdischarging, overheating, short circuit events, etc.). Further, during such conditions, the battery cells 32 may vent gases and/or other effluents into the interior of the enclosure assembly 34. The vent gases may be caused by an applied force or a thermal event, and can either cause or exacerbate an existing battery thermal event. A relatively significant amount of heat can be generated during battery thermal events, and if not contained, the generated heat can cascade to other battery internal components, thereby accelerating thermal runaway within the traction battery pack 24. This disclosure is therefore directed to traction battery pack and/or battery array designs that incorporate thermal suppression systems for mitigating thermal propagation during certain battery thermal events.

Figure 2:
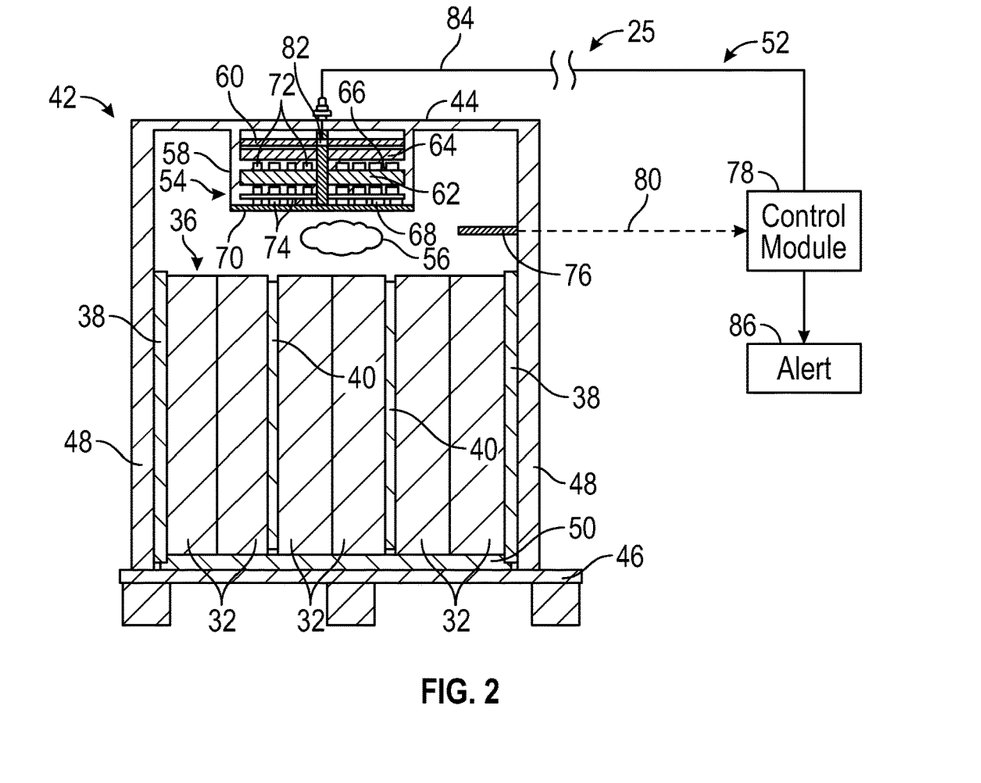
FIG. 2 illustrates an exemplary thermal suppression system for a battery array.

FIG. 2 illustrates an exemplary battery array 25 for a traction battery pack, such as the traction battery pack 24 of FIG. 1, for example. As explained in further detail below, the battery array 25 may incorporate aerosol features designed for mitigating thermal runaway during battery thermal events.

The battery array 25 may include a plurality of battery cells 32. The total number of battery cells 32 provided within the battery array 25 may vary and is not intended to limit this disclosure. The battery cells 32 may be grouped together in a cell stack 36 that is arranged between opposing array end plates 38. The cell stack 36 may further include one or more array spacer plates 40 that can be arranged between adjacent battery cells 32 of the cell stack 36.

A support structure 42 of the battery array 25 may substantially surround the cell stack 36. In an embodiment, the support structure 42 completely encloses the cell stack 36. The support structure 42 may include a top plate 44, a bottom plate 46, a pair of end plates 48, and a pair of side plates (not shown in the schematic, cross-sectional depiction of FIG. 2).

The bottom plate 46 of the support structure 42 may be arranged to function as a liquid cooled heat exchanger plate or "cold plate" of the battery array 25. For example, the bottom plate 46 may be part of a liquid cooling system that is configured for circulating a coolant, such as water mixed with ethylene glycol or any other suitable coolant, through an interior cooling circuit of the bottom plate 46. The coolant may pick up heat that is generated within the battery cells 32 as it circulates through the internal cooling circuit of the bottom plate 46. A thermal interface material 50 (e.g., epoxy resin, silicone based materials, thermal greases, etc.) may be disposed between the battery cells 32 of the cell stack 36 and the bottom plate 46 for facilitating heat transfer therebetween.

The battery array 25 may further include a thermal suppression system 52 for mitigating the effects of battery thermal events. The thermal suppression system 52 may include one or more aerosol devices 54 that may be integrated into the support structure 42 of the battery array 25. The aerosol device 54 may release aerosol particles in the event of a battery thermal event. The particles may form an aerosol cloud 56 over and around the cell stack 36, thereby suppressing heat generating effluents and causing a knockdown effect that cools the battery cells 32 without further thermal runaway.

In an embodiment, the aerosol device 54 includes a housing 58 that is integrated as part of the top plate 44 of the support structure 42. However, other configurations may also be possible depending on, for example, the orientation of the cell stack 36 relative to the support structure 42. The housing 58 may be fixedly secured to the top plate 44 or may be integrally formed as part of the top plate 44.

The aerosol device 54 of the thermal suppression system 52 may include a multi-layered structure that can be at least partially housed within the housing 58, with each layer of the structure having a unique function associated with mitigating thermal propagation during battery thermal events. The aerosol device 54 may include an aerosol ignition sheet 60, an aerosol generating sheet 62, a spacer 64, a separator grid 66, a direction grid 68, and a supporting sheet 70. Notably, the various sheets/layers of the aerosol device 54 are not drawn to scale, and in the interests of simplicity and clarity, are shown in a highly schematic manner.

In an embodiment, the aerosol ignition sheet 60 is the layer of the aerosol device 54 that is positioned closest to the top plate 44, and the supporting sheet 70 is the layer of the aerosol device 54 that is positioned closest to the cell stack 36. The supporting sheet 70 may be made of a plastic material and is designed to maintain a positioning of the aerosol ignition sheet 60, the aerosol generating sheet 62, the spacer 64, the separator grid 66, and the direction grid 68 within the housing 58 prior to any battery thermal event.

The aerosol ignition sheet 60 may be ignited in order to initiate a reaction mechanism of the aerosol device 54. The aerosol ignition sheet 60 may be made of a carbon based nitrate. In an embodiment, the carbon based nitrate includes nitrocellulose.

[moss] The aerosol generating sheet 62 is designed to react with the ignited aerosol ignition sheet 60 to create the aerosol cloud 56 in response to battery thermal events. The aerosol generating sheet 62 may be made of a potassium compound. In an embodiment, the potassium compound includes potassium nitrate.

The spacer 64 is designed to space the aerosol generating sheet 62 apart from the aerosol ignition sheet 60. The spacer 64 therefore helps control the timing of the reaction between the aerosol ignition sheet 60 and the aerosol generating sheet 62. In an embodiment, the spacer 64 is a plastic film.

The separator grid 66 may be at least partially positioned between the spacer 64 and the aerosol generating sheet 62. The separator grid 66 may include a plurality of openings 72 for directing particles of the ignited aerosol ignition sheet 60 toward the aerosol generating sheet 62. The separator grid 66 therefore helps control the reaction rate of the aerosol device 54. In an embodiment, the separator grid 66 is made of a flame retardant plastic.

The direction grid 68 may be positioned between the aerosol generating sheet 62 and the supporting sheet 70. The direction grid 68 may include a plurality of openings 74 for directing aerosol particles toward the cell stack 36. In an embodiment, the number of the openings 74 provided in the direction grid 68 is a lower number of openings compared to the number of the openings 72 provided in the separator grid 66. In another embodiment, the direction grid 68 is made of a flame retardant plastic.

A thermal sensing device 76 may be positioned within the battery array 25. In an embodiment, the thermal sensing device 76 is mounted to one of the end plates 48 at a location that is spaced apart from the cell stack 36. The thermal sensing device 76 may therefore be positioned to sense a temperature of the air within the battery array 25.

In an embodiment, the thermal sensing device 76 is a thermistor. In another embodiment, the thermal sensing device 76 is a flex film thermocouple. However, other suitable thermal sensing devices could be utilized for sensing the temperature of the air within the battery array 25.

The thermal sensing device 76 may be operably connected to a control module 78 (e.g., a battery electric control module (BECM)). The thermal sensing device 76 may be designed to communicate a signal 80 to the control module 78 when the temperature of the air within the battery array 25 exceeds a predefined temperature threshold (e.g., around 150° C.). Air temperatures that exceed the predefined temperature threshold may be indicative of battery thermal events. Therefore, in response to receiving the signal 80, the control module 78 may command activation of an electrical activation device 82 that is positioned in proximity to the aerosol ignition sheet 60. The electrical activation device 82 may then ignite the aerosol ignition sheet 60 to initiate the reaction mechanism of the aerosol device 54, eventually resulting in the formation of the aerosol cloud 56 over and/or around the cell stack 36.

The electrical activation device 82 may be operably connected to the control module 78 via an electrical connection cable 84. In an embodiment, the electrical activation device 82 is an electrically activated heating element. However, other types of ignition devices could alternatively be implemented within the scope of this disclosure.

In further response to receiving the signal 80, the control module 78 may command that an alert 86 be issued to a user of the electrified vehicle 12 containing the battery array 25. The alert can be an audible alert, a visual alert presented in the form of a message presented on a human machine interface associated with the electrified vehicle 12, for example, or both.

The reaction mechanism of the aerosol device 54 described above may represented by the following chemical equation (1):

$$KNO_3(s)+C_nH_mN_pO_q(s)=KHCO_3(s)+K_2CO_3(s)+CO_2(g)+N_2(g)+H_2O(g) \quad (1)$$

The reaction mechanism may occur in multiple stages. A first stage may involve removing propagation radicles from a battery thermal event tetrahedron. Potassium free radicals can break chain carriers such as H, OH, and O in the battery thermal event tetrahedron. These chain carriers may subsequently react with K+ free radicals generated during the chemical reaction between the aerosol ignition sheet 60 and the aerosol generating sheet 62 to form stable components, such as potassium hydroxide (KOH) and potassium carbonate gas, for example.

The chemical action of potassium radicals can be schematically represented by the following chemical equations (2) and (3):

$$K+OH=KOH \quad (2)$$

$$KOH+H=K+H_2O \quad (3)$$

Another stage of the reaction mechanism may involve the recombination of propagation radicals. For example, the potassium carbonate that may be formed during the chemical reaction may condense to a liquid and then to micron sized solid cooling aerosol particles. These aerosol particles may grow to a large surface area, thereby allowing recombination to occur with the chain carriers according to the following chemical equations (4) and (5):

$$O+H=OH \quad (4)$$

$$H+OH=H_2O \quad (5)$$

An aerosol extinguishing action may be achieved via the aerosol device 54 by lowering the temperature of the air within the battery array 25 to a temperature in which battery thermal events cannot continue. Heat absorption may occur via endothermic phase changes represented by chemical equation (6) and via endothermic decomposition reactions represented by chemical equation (7):

$$K_2CO_3(s) \rightarrow K_2CO_3(l) \rightarrow K_2CO_3(g) \quad (7)$$

$$2KHCO_3(s) \rightarrow K_2CO_3(s)+CO_2(g)+H_2O(g) \quad (8)$$

Another stage of the reaction mechanism may involve the dilution of the combustion zone within the battery array 25 by generating the aerosol cloud 56. The high surface area of the micron-size aerosol particles contained within the aerosol cloud 56 increases the likelihood of radical recombination and heat absorbing reactions, thus ensuring rapid extinguishment with a small amount of extinguishing material. The high rate of aerosol discharge achieved by the aerosol device 54 ensures a knockdown effect. Micron sized aerosol particles exhibit gas-like three-dimensional qualities that allow the aerosol agent to rapidly distribute throughout the battery array 25, including any concealed and/or shielded locations. Homogeneous distribution may be achieved in a matter of seconds, while relatively long holding times of up to 20 minutes of the aerosol cloud 56 can help mitigate thermal re-ignition.

Figure 3:
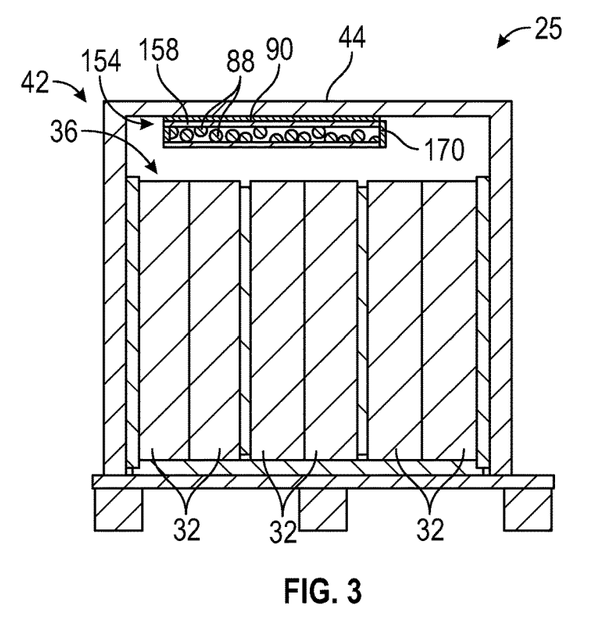
FIG. 3 illustrates another exemplary thermal suppression system.

FIG. 3 illustrates another exemplary aerosol device 154 of a thermal suppression system 152 for a battery array 25. The aerosol device 154 may provide a passive, non-electrical configuration that can be utilized as an alternative to the electrical configuration shown in FIG. 2, for example.

In this embodiment, the aerosol device 154 may include a housing 158 and a plurality of microcapsules 88 contained within the housing 158. The microcapsules 88 may be contained within the housing 158 via a supporting sheet 170. The housing 158 may be secured to the top plate 44 of the support structure 42 of the battery array 25 using a double sided adhesive tape 90, for example.

Figure 4:
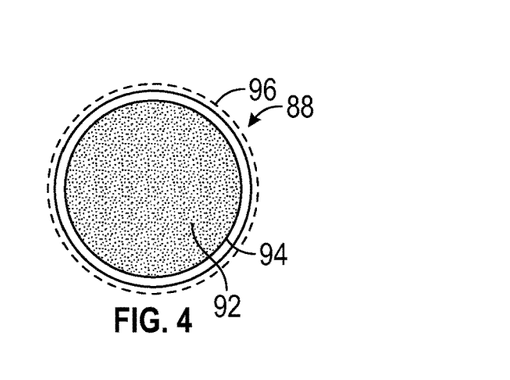
FIG. 4 illustrates an exemplary microcapsule of the thermal suppression system of FIG. 3.

In an embodiment, each microcapsule 88 may include a nanocapsule 92 covered by a polymer cover 94 (see FIG. 4). A nanocoating 96 may be applied to the polymer cover 94. In an embodiment, the nanocapsule 92 includes potassium nitrate and the nanocoating 96 includes nitrocellulose. The nanocapsule 92 may therefore act as an aerosol generating portion of the aerosol device 154, and the nanocoating 96 may act as an aerosol ignition portion of the aerosol device 154. When a temperature of the air inside the battery array 25 exceeds a predefined temperature threshold, the potassium nitrate may be released from the nanocapsule 92 for reaction with the nitrocellulose in order to mitigate the battery thermal event.

Figure 5:
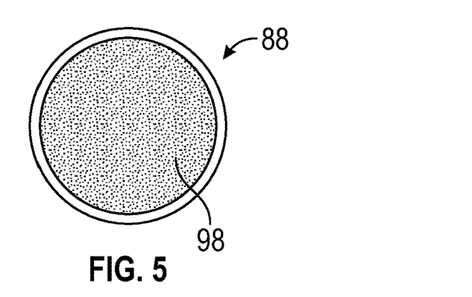
FIG. 5 illustrates another exemplary microcapsule of the thermal suppression system of FIG. 3.

In another embodiment, each microcapsule 88 may include a clean extinguishing agent 98 (see FIG. 5). In an embodiment, the clean extinguishing agent 98 is FK-5-1-12. The clean extinguishing agent 98 may be released from the microcapsule 88 when a temperature of the air inside the battery array 25 exceeds a predefined temperature threshold, thereby mitigating the battery thermal event.

Figure 6:
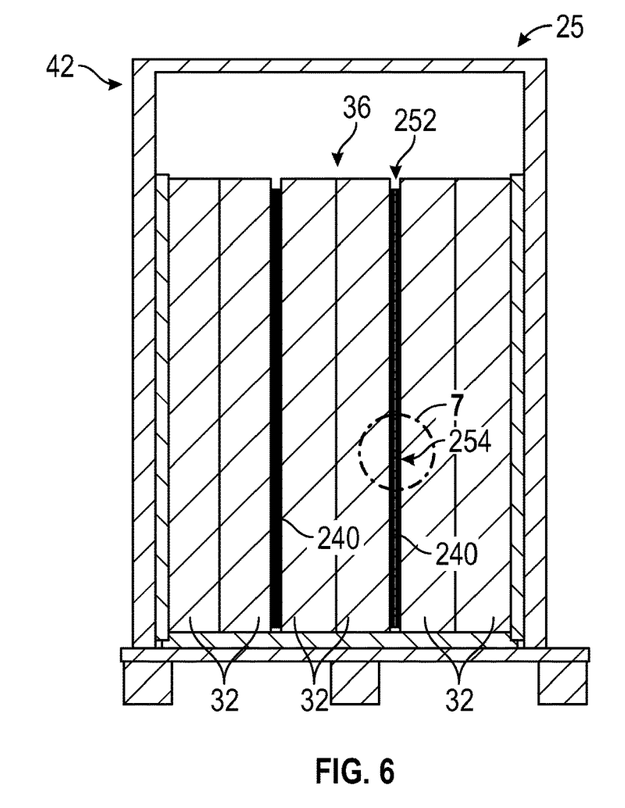
FIG. 6 illustrates another exemplary thermal suppression system.

FIG. 6 illustrates another exemplary thermal suppression system 252 for a battery array 25. The thermal suppression system 252 is another example of a passive, non-electrical configuration. In this embodiment, the thermal suppression system 252 may include one or more aerosol devices 254 that are integrated into at least one array spacer plate 240 of the battery array 25.

Figure 7:
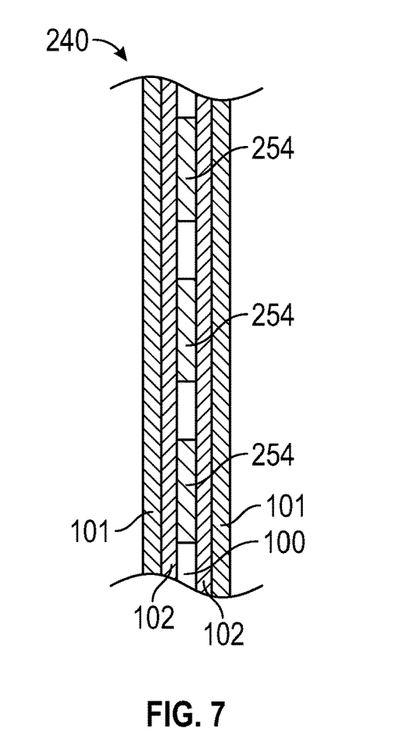
FIG. 7 is a blown up view of select portions of the thermal suppression system of FIG. 6.
Figure 8:
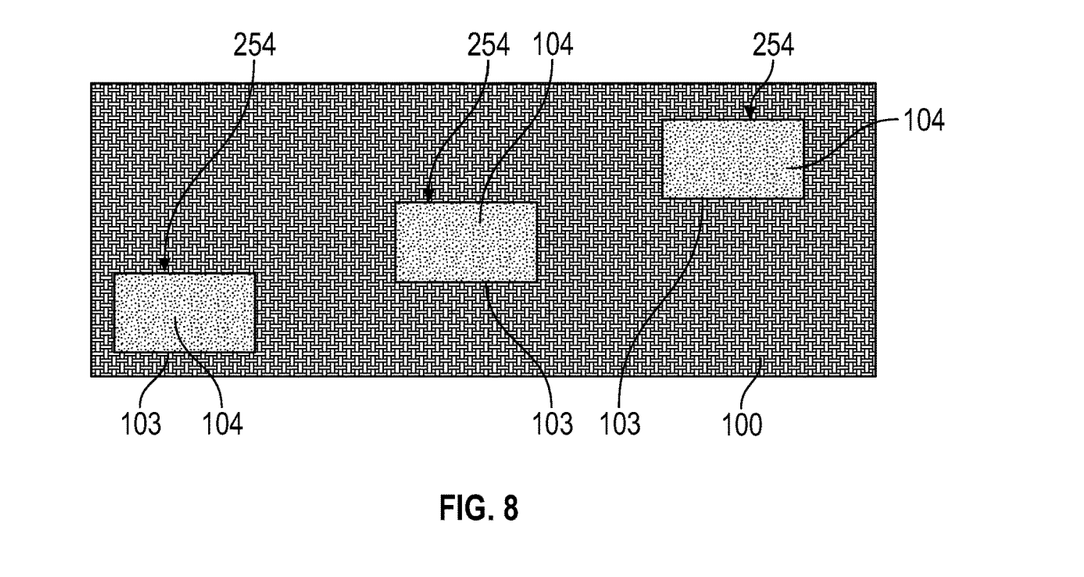
FIG. 8 illustrates a thermal barrier sheet of the thermal suppression system of FIG. 6.

Referring now to FIGS. 7 and 8, one or more of the array spacer plates 240 of the battery array 25 may include a thermal barrier sheet 100 positioned between a pair of compression foam sheets 101. The thermal barrier sheet 100 may be secured to each of the compression foam sheets by a double sided adhesive tape 102.

In an embodiment, the compression foam sheets 101 are high temperature foam sheets capable of withstanding environments of up to 800° C. The compression foam sheets 101 may be made of polyurethane with integrated inorganic additives such as aerogel (0.5 to 2%), milled Panox® fibers (1 to 1.5%), or melamine powder (1-1.5%), for example.

One or more aerosol devices 254 may be integrated into or otherwise secured to the thermal barrier sheet 100. Each aerosol device 254 may include a plastic sheet 103 coated with a nanocoating 104. In an embodiment, the plastic sheet 103 includes potassium nitrate and the nanocoating 104 includes nitrocellulose. Therefore, the plastic sheet 103 may act as an aerosol generating portion of the aerosol device 254, and the nanocoating 104 may act as an aerosol ignition portion of the aerosol device 254. When the temperature inside the battery array 25 exceeds a predefined temperature threshold, the potassium nitrate may be released from the plastic sheet 103 for reaction with the nitrocellulose in order to mitigate the battery thermal event.

Figure 9:
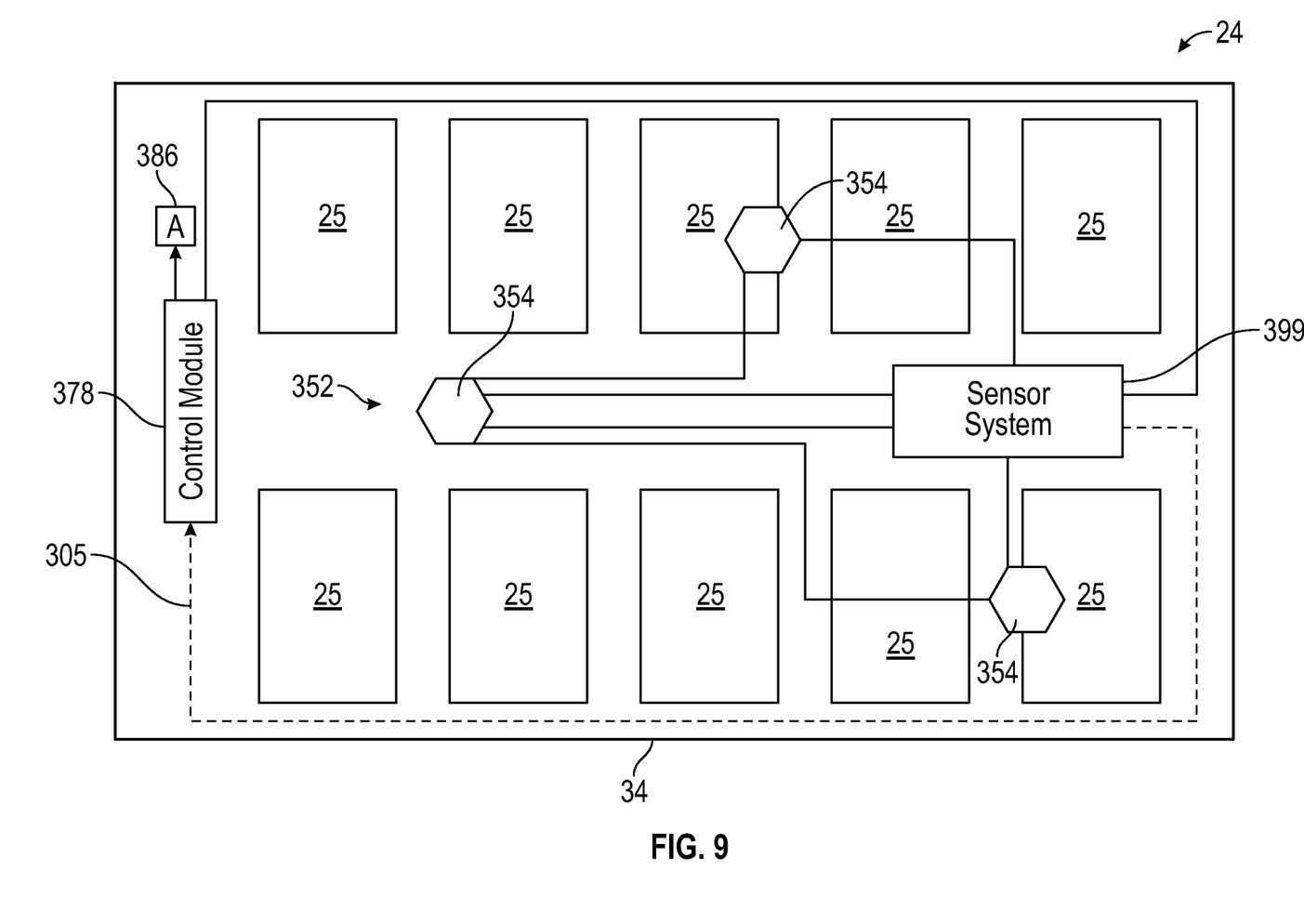
FIG. 9 illustrates an exemplary thermal suppression system for a traction battery pack.

The thermal suppression systems of FIGS. 2, 3-5, and 6-8 are each implemented at the battery array level. However, in other embodiments, a thermal suppression system could be implemented at the traction battery pack level. FIG. 9 illustrates one such "battery pack level" implementation.

Referring now specifically to FIG. 9, a traction battery pack 24 may include a plurality of battery arrays 25 housed within an interior of an enclosure assembly 34. Although the traction battery pack 24 of FIG. 9 is depicted as having ten battery arrays, the traction battery pack 24 could be provided with a greater or fewer number of battery arrays within the scope of this disclosure.

The traction battery pack 24 may further include a thermal suppression system 352 for mitigating the effects of battery thermal events. The thermal suppression system 352 may include one or more aerosol devices 354 that may each be configured to release aerosol particles in the event of a battery thermal event. The aerosol devices 354 may be placed at any location inside the enclosure assembly 34. The specific placement of the aerosol devices 354 is therefore not intended to limit this disclosure.

In an exemplary embodiment, each aerosol device 354 includes the design of the aerosol device 354 of FIG. 2. The aerosol devices 354 may be electrically coupled to one another and to a sensor system 399. The sensor system 399 may be configured to detect when the temperature of the air inside the enclosure assembly 34 exceeds a predefined temperature threshold (e.g., around 150° C.). Temperatures that exceed the predefined temperature threshold may be indicative of battery thermal events. The sensor system 399 may communicate a signal 305 to a control module 378 (e.g., a battery electric control module (BECM)) of the thermal suppression system 352 when the predefined temperature threshold is exceeded. In response to receiving the signal 305, the control module 378 may command electrical activation of one or more of the aerosol devices 354 to initiate the reaction mechanism, eventually resulting in the formation of an aerosol cloud over and/or around one or more of the battery arrays 25. The control module 378 may further command that an alert 386 be issued to a user of the electrified vehicle 12 containing the traction battery pack 24.

Figure 10:
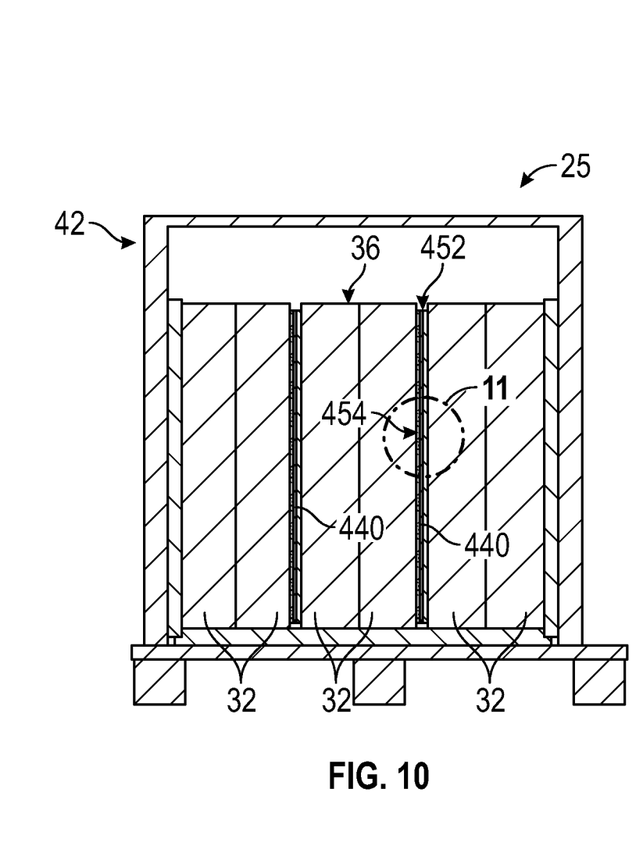
FIG. 10 illustrates another exemplary thermal management system for a battery array.

FIG. 10 illustrates another exemplary thermal suppression system 452 for a battery array 25. The thermal suppression system 452 is another example of a passive, non-electrical configuration. In this embodiment, the thermal suppression system 452 may include one or more aerosol devices 454 that are integrated into at least one array spacer plate 440 of the battery array 25.

Figure 11:
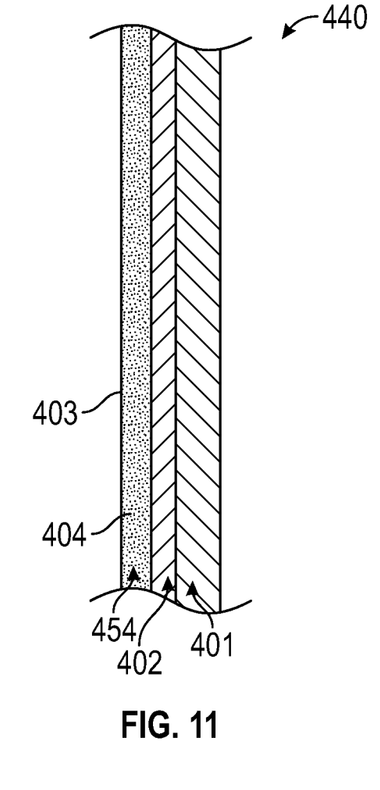
FIG. 11 is a blown up view of select portions of the thermal suppression system of FIG. 10.

Referring now to FIG. 11, one or more of the array spacer plates 440 of the battery array 25 may include a high compression foam 401, a double sided adhesive tape 402, and the aerosol device 454. The aerosol device 454 may be secured to the foam 401 by the double sided adhesive tape 402.

In an embodiment, the high compression foam 401 is a high temperature foam capable of withstanding environments of up to 800° C. The high compression foam 401 may be made of polyurethane with integrated inorganic additives such as aerogel (0.5 to 2%), milled Panox® fibers (1 to 1.5%), or melamine powder (1-1.5%), for example.

The aerosol device 454 may include a heat absorbing film 403 that includes a clean extinguishing agent 498. In an embodiment, the clean extinguishing agent 498 is FK-5-1-12. The clean extinguishing agent 498 may be released from the film 403 when a temperature inside the battery array 25 exceeds a predefined temperature threshold, thereby mitigating the battery thermal event.

The exemplary battery thermal management systems of this disclosure are designed to mitigate or even prevent thermal runaway inside electrified vehicle traction battery packs. The thermal management systems may provide numerous advantages over known solutions, including but not limited to being simple to install, environmentally friendly, compact, non-toxic, non-corrosive, and non-conductive.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery thermal suppression system, comprising:
a battery array; and
an aerosol device integrated as part of the battery array and including an aerosol ignition portion and an aerosol generating portion that is configured to react with the aerosol ignition portion in response to an ignition of the aerosol ignition portion,
wherein the aerosol ignition portion comprises a nitrocellulose,
wherein the aerosol ignition portion is an aerosol ignition sheet and the aerosol generating portion is an aerosol generating sheet that are part of a multi-layered structure arranged within a housing of the aerosol device,
wherein the multi-layered structure includes the aerosol ignition sheet, the aerosol generating sheet, a spacer, a separator grid, and a direction grid.

2. The battery thermal suppression system as recited in claim 1, wherein the aerosol generating portion includes a potassium nitrate.

3. The battery thermal suppression system as recited in claim 1, wherein the aerosol device is integrated as part of a support structure that surrounds a cell stack of the battery array.

4. The battery thermal suppression system as recited in claim 3, wherein a housing of the aerosol device is connected to a top plate of the support structure.

5. The battery thermal suppression system as recited in claim 1, wherein the battery array includes a first battery cell, a second battery cell, and an array spacer plate positioned between the first battery cell and the second battery cell.

6. The battery thermal suppression system as recited in claim 5, wherein the aerosol device is integrated as part of the array spacer plate.

7. The battery thermal suppression system as recited in claim 1, comprising a thermal sensing device positioned within the battery array and configured to detect an air temperature within the battery array.

8. The battery thermal suppression system as recited in claim 7, comprising a control module programmed to command the ignition of the aerosol ignition portion when the air temperature exceeds a predefined temperature threshold.

9. The battery thermal suppression system as recited in claim 8, wherein the control module is further programmed to command an alert when the air temperature exceeds the predefined temperature threshold.

10. The battery thermal suppression system as recited in claim 1, wherein the spacer is a plastic film that spaces the aerosol generating sheet apart from the aerosol ignition sheet.

11. The battery thermal suppression system as recited in claim 1, wherein the separator grid is comprised of a flame retardant plastic.

12. The battery thermal suppression system as recited in claim 1, wherein the separator grid is at least partially positioned between the spacer and the aerosol generating sheet and includes a plurality of openings for directing particles toward the aerosol generating sheet.

13. The battery thermal suppression system as recited in claim 1, wherein the direction grid is comprised of a flame retardant plastic.

14. The battery thermal suppression system as recited in claim 1, wherein the direction grid is positioned between the aerosol generating sheet and a supporting sheet of the multi-layered structure.

15. The battery thermal suppression system as recited in claim 1, wherein the direction grid includes a plurality of openings for directing particles toward the battery array.

16. The battery thermal suppression system as recited in claim 8, wherein the control module is programmed to activate an electrical activation device to ignite the aerosol ignition portion.

17. A battery thermal suppression system, comprising:
a battery array; and
an aerosol device integrated as part of the battery array and including an aerosol ignition portion and an aerosol generating portion that is configured to react with the aerosol ignition portion in response to an ignition of the aerosol ignition portion,
wherein the aerosol ignition portion comprises a nitrocellulose,
wherein the aerosol ignition portion and the aerosol generating portion are part of a microcapsule housed within a housing of the aerosol device.

18. The battery thermal suppression system as recited in claim 17, wherein the aerosol ignition portion is established by a nanocoating of the microcapsule, and the aerosol generating portion is established by a nanocapsule of the microcapsule.

19. A battery thermal suppression system, comprising:
a battery array; and
an aerosol device integrated as part of the battery array and including an aerosol ignition portion and an aerosol generating portion that is configured to react with the aerosol ignition portion in response to an ignition of the aerosol ignition portion,
wherein the aerosol ignition portion comprises a nitrocellulose,
wherein the battery array includes a first battery cell, a second battery cell, and an array spacer plate positioned between the first battery cell and the second battery cell,
wherein the aerosol device is integrated as part of the array spacer plate,
wherein the array spacer plate includes a thermal barrier sheet positioned between a pair of compression foam sheets.

20. The battery thermal suppression system as recited in claim 19, wherein the aerosol device include a plastic sheet coated with a nanocoating, and further wherein the plastic sheet establishes the aerosol generating portion and the nanocoating establishes the aerosol ignition portion.

* * * * *